(12) United States Patent
Plantan et al.

(10) Patent No.: US 7,255,205 B2
(45) Date of Patent: Aug. 14, 2007

(54) DISC BRAKE LOCATED OUTSIDE WHEEL ENVELOPE

(75) Inventors: Ronald S. Plantan, Westlake, OH (US); Darwin A. Garrison, Brunswick, OH (US); Dennis R. Shamine, Lorain, OH (US)

(73) Assignee: Bendix Spicer Foundation Brake LLC, Elyria, OH (US)

( * ) Notice: Subject to any disclaimer, the term of this patent is extended or adjusted under 35 U.S.C. 154(b) by 0 days.

(21) Appl. No.: 10/803,050

(22) Filed: Mar. 18, 2004

(65) Prior Publication Data

US 2005/0205365 A1    Sep. 22, 2005

(51) Int. Cl.
*B60T 1/06* (2006.01)

(52) U.S. Cl. ............... 188/18 A; 188/218 R; 188/264 AA

(58) Field of Classification Search ......... 188/218 XL, 188/218 R, 81.1, 72.1, 18 A, 264 A, 264 AA; 301/6.8, 9.2
See application file for complete search history.

(56) References Cited

U.S. PATENT DOCUMENTS

| 4,102,443 | A | * | 7/1978 | Kohler et al. ......... 188/218 XL |
|---|---|---|---|---|
| 4,173,269 | A | * | 11/1979 | Craig ................. 188/71.5 |
| 4,540,069 | A | | 9/1985 | Bolenbaugh et al. |
| 4,729,455 | A | * | 3/1988 | May ..................... 188/58 |
| 5,143,184 | A | * | 9/1992 | Snyder et al. ........ 188/218 XL |
| 6,564,913 | B2 | * | 5/2003 | Baumgartner et al. ........... 188/218 XL |
| 6,578,676 | B1 | | 6/2003 | Lin |
| 2002/0029940 | A1 | * | 3/2002 | Iizuka et al. ............ 188/24.11 |
| 2003/0111893 | A1 | * | 6/2003 | Hamperl .................. 301/105.1 |
| 2003/0136613 | A1 | * | 7/2003 | Seki .................... 188/71.1 |

FOREIGN PATENT DOCUMENTS

| DE | 101 22 202 C1 | 12/2002 |
|---|---|---|
| EP | 0 856 679 B1 | 8/1998 |
| FR | 2 616 712 A1 | 12/1988 |
| JP | 08-20319 | 1/1996 |
| JP | 2001-107996 | 4/2001 |

* cited by examiner

*Primary Examiner*—Devon Kramer
(74) *Attorney, Agent, or Firm*—Crowell & Moring LLP

(57) ABSTRACT

A disc brake for a vehicle such as a commercial vehicle, wherein the brake rotor extends from a hub end of an axle inboard a sufficient distance to place the friction surface of the rotor and the brake caliper outside the envelope of a wheel mounted at the end of the axle. The placement of the rotor friction surface and the caliper outside the envelope of the wheel enhances brake cooling, makes the brake more readily accessible for inspection and maintenance without significant vehicle disassembly, and permits the rotor outer diameter to be extended beyond the diameter of the wheel rim, thereby lowering brake components stresses and permitting use of lighter, lower cost brake components.

8 Claims, 1 Drawing Sheet

DISC BRAKE LOCATED OUTSIDE WHEEL ENVELOPE

BACKGROUND AND SUMMARY OF THE INVENTION

The present invention relates to disc brakes for vehicles and, in particular, to brake discs for air-operated disc brakes for commercial vehicles.

Pneumatically-operated disc brakes have been undergoing development and deployment on commercial vehicles since at least the 1970's, and are beginning to replace drum-style brakes due to advantages in areas such as cooling, fade resistance and serviceability. German patent publication DE 40 32 886 A1, and in particular FIG. 1 of this document, discloses an example of such an air disc brake. In this design, a pneumatic diaphragm chamber 12 is attached to a rear face of the disc brake caliper housing 3, and applies a brake actuation force through a linear actuator rod 10 to a brake actuator lever 9 within the caliper. The brake's actuator lever in turn transfers and multiplies the force applied by the actuator rod to one or more spindles 14, which force brake pads 20 against a brake disc or rotor 1. The terms "brake disc," "rotor" and "brake rotor" are used interchangeably herein.

The adaptation of disc brake technology to commercial vehicle applications has not been without engineering challenges. Commercial vehicle wheel rims are sized, both in diameter and axial offset, to provide adequate clearance for the drum-type brakes historically employed on such vehicles. The resulting space envelope between the wheel and its axle is limited, leaving little space available for a pneumatic disc brake. Further, the deep offset of a typical commercial vehicle wheel essentially surrounds the axle hub and the brake mounted thereon, substantially inhibiting free flow of cooling air to the brake.

The combination of limited space and limited air flow within commercial vehicle wheels is a challenge to disc brake performance and longevity. For example, due to the limited inner diameter of commercial vehicle wheels, brake rotors located within the envelope defined by a wheel must also be limited in diameter. Accordingly, the kinetic energy of the vehicle that must be converted to heat energy in the brake in order to slow the vehicle must be deposited in a relatively small diameter disk, which in turn results in undesirably elevated disc temperatures. There are at least three concerns with such elevated disc temperatures, including disc dimensional instability (e.g., "warping"), shortening of disc service life due to accelerated disc cracking and wear, and excessive heat transfer from the high-temperature disc rotor hub to the vehicle's axle hub, hub bearings and other components. The resulting shortened component life can create a maintenance burden, deterring wider adoption of pneumatically-operated disc brake technology.

In addition to the limited space envelope, the shrouding of smaller-diameter brake discs by the enveloping wheel rims substantially limits the ability of cooling air flow to reach the discs. The wheel shrouding thus also contributes to excessive brake disc temperatures by limiting the disc's ability to reject heat generated during braking to the environment.

One approach to addressing these issues has been to design brake discs with enhanced cooling features, such as the brake disc disclosed in U.S. Pat. No. 6,626,273 B1, which is formed essentially as two parallel brake rotor friction surfaces joined with internal links to create internal ventilation ducts between the parallel surfaces. Internal ventilation in this manner effectively doubles the disc surface area exposed to the air for heat transfer, without increasing an outer diameter of the brake disc. In addition, brake discs have been developed to mechanically de-couple the brake rotor from its hub, such as the disc having splines disclosed in U.S. Pat. No. 6,564,913 B2. By so freeing the friction surfaces of the brake rotor from an integral or rigid, fixed mounting, mechanical stresses on the disc during braking (such as bending moments from uneven braking forces applied by the brake caliper and thermal expansion in the radial direction) are decreased. The reduction of mechanical stresses in turn allows the disc to tolerate higher thermally-induced stresses, and thus be able to absorb additional braking-generated heat.

The requirement of fitting the disc brake unit within existing wheels also constrains caliper design. Brake calipers typically straddle a brake rotor in order for the caliper to simultaneously press brake pads against both sides of the rotor. If the entire brake unit is to fit within the wheel, the thickness of the caliper above the outer radius of the rotor must be kept to a minimum. This design constraint limits the designer's ability to improve the caliper in areas such as strength and manufacturing cost. For example, if the rotor diameter is maximized within the wheel envelope, essentially no room is left for any form of reinforcement for the portion of the caliper above the rotor (the portion bridging the caliper's inner and outer halves). The limited envelope afforded by the wheel also forces the designer to arrange any caliper housing appendages (such as pneumatic actuators) toward the inboard side of the vehicle's axle, rather than radially outward, even if the latter would result in a preferred brake and axle configuration.

The foregoing approaches to accommodating the constraints of the wheel envelope, while beneficial, have drawbacks. Ventilated rotors such as those in U.S. Pat. No. 6,626,273 B1 are typically very complex castings, and thus are costly in terms of both manufacturing process (e.g., labor and equipment-intensive mold preparation and casting processes) and process yield (i.e., relatively high defective casting rejection rates). Similarly, use of non-fixed brake rotors can require the production and use of a large number of individual component parts, increasing expense, assembly and possibly service efforts. Other alternatives such as utilizing high heat-tolerant disc materials (e.g., ceramic-matrix-composite ("CMC") materials) also have their own limitations, including high cost (CMC-type materials costs are on the order of ten times greater than equivalent iron brake discs), and, in the case of a brake caliper configured to maximum disc diameter, the requirement for wheel removal in order to be able to access the brake pads for inspection or replacement.

Thus, despite the varying approaches to improving disc brake performance in the commercial wheel environment, the size and location of the wheel envelope remains a significant impediment to improved brake performance, life and serviceability.

In order to overcome the foregoing problems, it is an object of the present invention to provide a disc brake with a brake rotor and a specialized metal or composite hub or hub adapter suitable for mounting on an axle of a vehicle, preferably a commercial vehicle, which permit location of the disc brake assembly sufficiently inboard of the wheel (i.e., toward the center of the vehicle) to permit the friction surface portion of the brake disc and the brake caliper to be located outside the envelope of a wheel mounted on the hub It is a further object to provide a disc brake located outside the envelope of a wheel wherein the brake rotor has an outer radius larger than the radius of the wheel rim, and the caliper straddles the brake disc and is affixed to the vehicle axle such that the caliper is also located outside the envelope of the wheel rim and its tire. Preferably, the rotor is disposed such that its friction surface is generally centered opposite the wheel's outer tire retention bead.

With a conventional axle, particularly a conventional commercial vehicle axle, the hub member rotatably mounted on the end of the axle is configured with a flange located on an outboard end of the hub for receiving a bolting flange of a wheel rim. Where such axles are equipped with a conventional disc brake, a brake rotor is typically mounted to the hub inboard of the hub's wheel bolting flange, thus placing the rotor within the envelope defined by the wheel rim. In addition to limiting brake diameter, this arrangement typically requires hub removal in order to service the brake rotor. In the present invention, a specialized hub or hub adapter is provided with its bolting flange preferably toward an inboard end of the hub, and is adapted to receive the brake rotor on the outboard side of the bolting flange. This arrangement allows the rotor to be serviced without hub removal, as the rotor, which may be, for example, bolted to the specialized hub flange or captured between the hub and a wheel bolted to the hub, may pass outward over the hub without encountering interferences. This arrangement also places the hub portion of the brake rotor relatively near an inboard edge of the wheel, minimizing the distance the friction surface of the rotor must be offset from the hub portion in order to clear the wheel, and thereby minimizing rotor weight and cost.

The present invention's location of the disc brake outside of a vehicle's wheel envelope has a number of advantages. The direct exposure of brake components to the cooling air stream greatly enhances brake component cooling. As a result, the need for complex, expensive ventilated rotors is decreased and may be altogether eliminated. The increased cooling of the disk also reduces the amount of heat transferred to the hub portion of the rotor and the vehicle axle, and helps reduce or eliminate brake fade that can otherwise occur when sustained braking results in an overheated brake condition. The enhanced cooling also lowers caliper and brake pad temperatures, increasing component life and decreasing degradation of heat-sensitive components such as rubber boots and o-rings. This brake positioning also offers substantially improved brake inspection and servicing, as the friction portion of the brake disc, the caliper and the brake pads are no longer shrouded by the vehicle wheel. In particular, this arrangement permits immediate visual inspection of brake pads and reduction of pad replacement time to mere minutes due to the elimination of the need to jack up the vehicle axle and remove one or more wheels to access the brake.

Additional benefits of increasing the brake disc outer diameter beyond the wheel rim include an increase in rotor mass at the outer periphery of the rotor for absorption of additional braking heat energy, thereby helping lower rotor peak temperature. The increased rotor diameter also results in a corresponding decrease in the forces and stresses applied to the brake caliper. For example, in order to obtain the same level of braking torque at the wheel as achieved by a disc brake within the wheel envelope, the increased moment arm about the vehicle axle provided by the larger diameter rotor results in a corresponding decrease in the amount of clamping force needed to be applied by the caliper.

Alternatively, for the same level of caliper clamping force, the larger diameter brake disc can generate a greater braking torque than a within-wheel disc brake. In those applications where greater braking torque is not required, the reduced caliper stresses resulting from a larger diameter rotor permits further optimization of the caliper design. For example, because the caliper need only be designed to withstand lower loads, a simplified and smaller caliper and mounting structure may be employed, with commensurate reductions in weight and manufacturing costs.

Another advantage of the present invention's location of the disc brake outside of the envelope is that a single disc brake design may be compatible with a variety of different industry-standard wheel sizes. As an example, a single disc brake unit adapted to be located outside a wheel envelope may be used with axles equipped with industry-standard commercial vehicle 19.5-inch wheels as well as axles using industry-standard 22.5-inch wheels. Such parts commonality offers axle assembly manufacturers and vendors substantial inventory and product support cost savings. Thus, commercial vehicles may be provided with a common disc brake which offers longer life and lower cost than present in-wheel disc brakes.

Other objects, advantages and novel features of the present invention will become apparent from the following detailed description of the invention when considered in conjunction with the accompanying drawings.

DETAILED DESCRIPTION OF THE DRAWINGS

Figure 1:
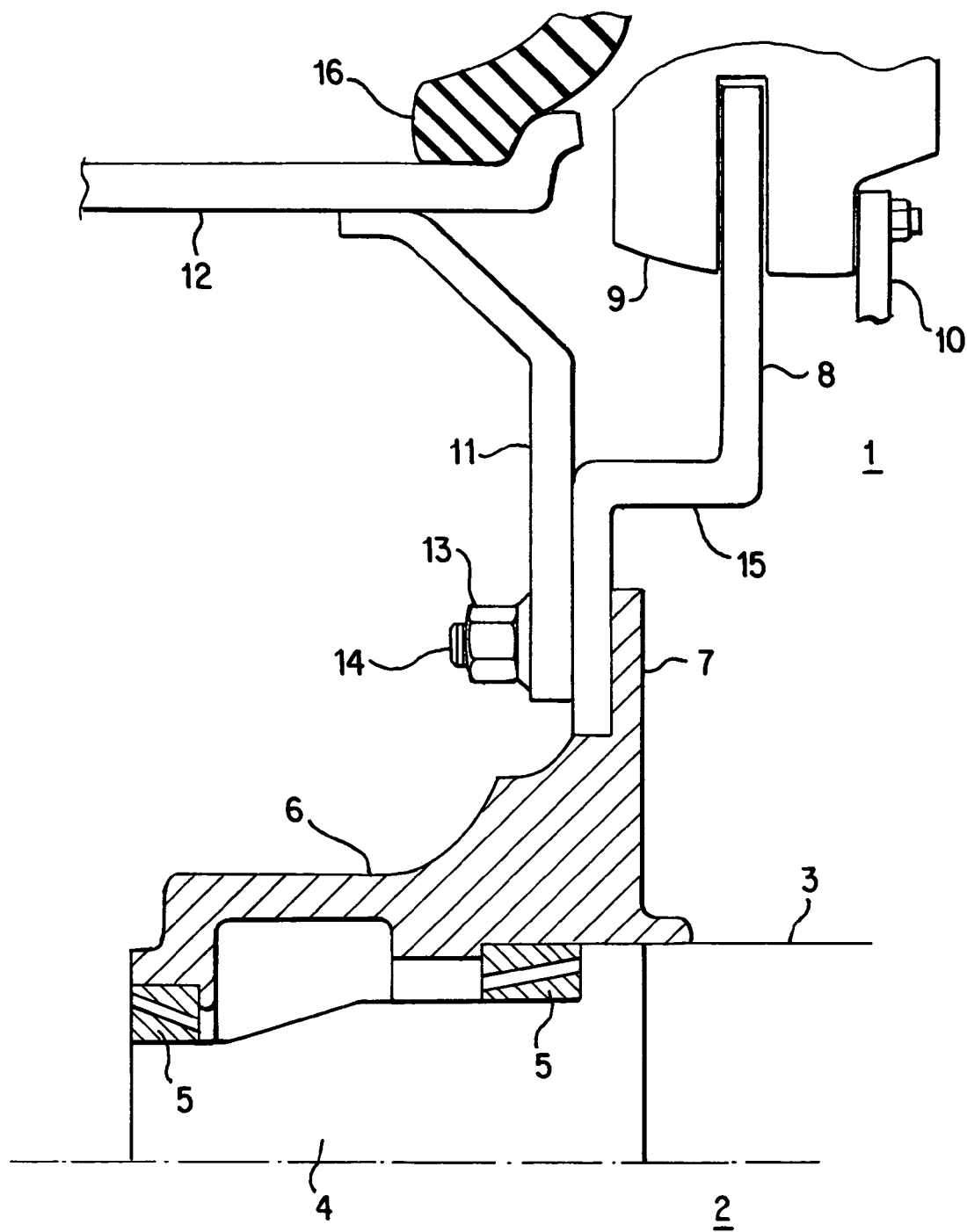
FIG. 1 is a cross-sectional view of an outboard located disc brake in accordance with an embodiment of the present invention.

FIG. 1 is a cross sectional view of one-half of a disc brake assembly 1 disposed on an end of a commercial vehicle axle 2. A symmetrical portion of axle 2 below the centerline of the axle is not shown for clarity.

Vehicle axle 2 includes an axle tube 3 and an axle stub 4 located at an outboard end of the axle. Bearings 5, whose details are not illustrated in the figure for clarity, rotatably support a specialized hub member 6 on axle stub 4. Hub member 6 is formed in this embodiment with a flange portion 7 with an outboard face adapted to receive a brake rotor 8 of brake disc assembly 1. Alternatively, the rotor may be affixed to the hub in other configurations, such as bolting to an inboard face of flange 7 or to a series of lugs projecting radially outward from the hub. If alternative mounting arrangements are employed, it is preferable that the ability to remove the rotor from the hub without hub removal be preserved, for example by spacing the aforementioned bolting lugs about the hub circumference such than when the rotor is unbolted from the hub, corresponding bolting tabs on the inner diameter of the rotor may pass between the hub lugs.

In addition to rotor 8, brake disc assembly 1 also includes a brake caliper 9 (illustrated without its attached actuator) straddling an outer diameter region of rotor 8, and a caliper mounting bracket 10. In this embodiment caliper 9 is bolted to mounting bracket 10. Mounting bracket 10 may be affixed to the vehicle in any of a variety of well-known configurations, as long as caliper 9 is non-rotatably held over rotor 8. For example, mounting bracket 10 may be affixed to the outer surface of axle tube 3 by welding.

Rotor 8 is held against hub flange portion 7 by wheel bolting flange 11 of wheel rim 12. Wheel rim 12 and bolting flange 11 are schematic illustrations of an industry-standard wheel, such as a 19.5 inch or 22.5 inch wheel commonly employed on commercial vehicles in the U.S. Wheel bolting flange 11 in turn is retained on hub member 6 by lug nuts 13 threaded onto lug bolts 14 projecting from hub flange portion 7. Alternatively, rotor 8 may be separately bolted to hub flange portion 7, thereby ensuring retention of the rotor when the wheel is removed.

In this embodiment, rotor 8 is provided with a connecting portion 15 essentially parallel to axle 2 which offsets the friction portion of the rotor from the area of hub flange portion 7 toward the vehicle center, such that the friction surface of the rotor and brake caliper 9 are disposed inboard of wheel rim 12 and its tire 16. Rotor 8 is illustrated as a one-piece solid rotor, however, the rotor alternatively may be a multi-piece structure built-up from subassemblies, such as an integral hub and connecting flange section to which a replaceable friction surface section is secured, and may include additional cooling features, such as cooling fins, internal radial vents, and heat transfer blocks to inhibit braking heat transfer to axle 2.

As illustrated, the outer radius of brake rotor 8 and caliper 9 may extend beyond the inner radius of wheel rim 12. The increased brake disc radius possible at this displaced location permits the generation of greater braking torque for a given amount of disc brake lining application force than could be generated by a brake disc small enough to fit within wheel rim 12. This brake disc configuration also permits improved brake cooling by placing the friction surface portion of rotor 8 and caliper 9 out in a cooling air region rather than within the relatively shrouded region within wheel rim 12.

The foregoing disclosure has been set forth merely to illustrate the invention and is not intended to be limiting. For example, while the above illustrated embodiment includes a specialized hub member adapted to receive a rotor and an industry-standard wheel, alternative rotor and wheel mounting arrangements, such as separate wheel and rotor mounting flanges on the hub, or the provision of an adapter which affixes the rotor of the present invention to a conventional axle hub, may be envisioned, as long as the objective of providing a disc brake assembly outside the wheel envelope is met. Because other such modifications of the disclosed embodiments incorporating the spirit and substance of the invention may occur to persons skilled in the art, the invention should be construed to include everything within the scope of the appended claims and equivalents thereof.

What is claimed is:

1. A commercial vehicle axle assembly, comprising:
   a vehicle axle;
   a wheel located at each end of the vehicle axle; and
   a disc brake disposed at each end of the vehicle axle, each disc brake including:
     a rotor; and
     a caliper disposed to apply a braking force to a friction surface portion of the rotor,
   wherein
     the rotor has a hub portion mounted on a hub at the end of the axle,
     the rotor hub portion is located radially within an axially-inboard-extending envelope of the wheel
     the rotor has a connecting portion extending from the hub portion which places the friction portion axially inboard toward a center of the vehicle axle a distance sufficient to place the friction portion outside the axially-inboard-extending envelope of the wheel.

2. The vehicle axle assembly of claim 1, wherein the friction portion has an outer radius greater than an inner radius of a rim of the wheel.

3. The vehicle axle assembly of claim 1, wherein the caliper is affixed to a caliper mount.

4. The vehicle axle assembly of claim 3, wherein the caliper mount is affixed to the vehicle axle.

5. The vehicle axle assembly of claim 1, wherein the axle hub is adapted to receive the hub portion of the rotor, and the rotor is held between the axle hub and the wheel.

6. The vehicle axle assembly of claim 2, wherein the axle hub is adapted to receive the hub portion of the rotor, and the rotor is held between the axle hub and the wheel.

7. The vehicle axle assembly of claim 1, further comprising:
   a hub adapter,
   wherein the hub adapter is arranged to receive the hub portion of the rotor and is disposed on the axle hub such that the rotor is axially inboard of the wheel.

8. The vehicle axle assembly of claim 2, further comprising:
   a hub adapter,
   wherein the hub adapter is arranged to receive the hub portion of the rotor and is disposed on the axle hub such that the rotor is axially inboard of the wheel.

* * * * *